June 27, 1950 W. H. McCLOSKEY 2,512,749
FLUID SEALING DEVICE
Filed July 24, 1946
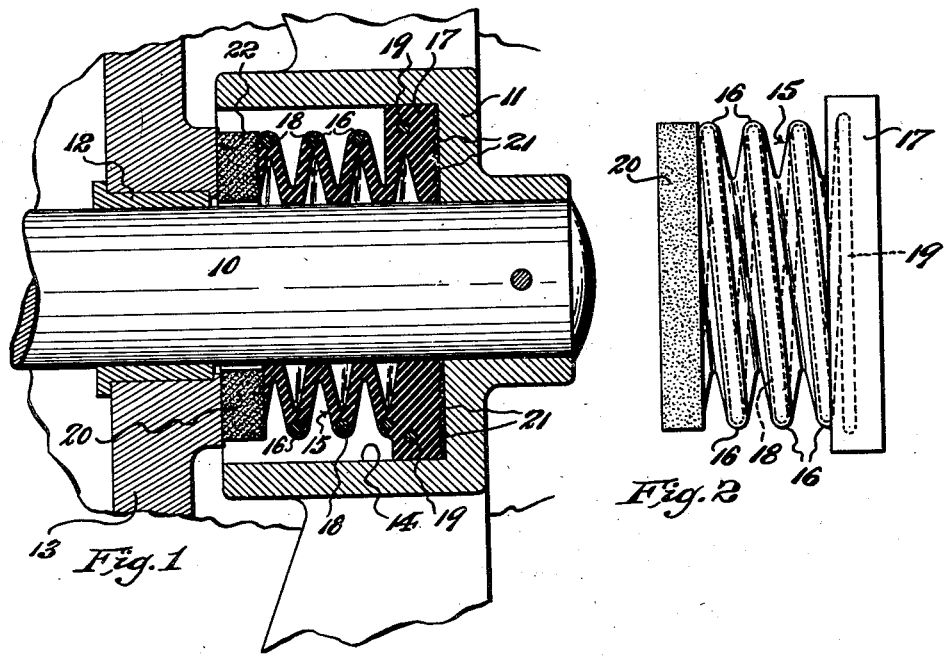
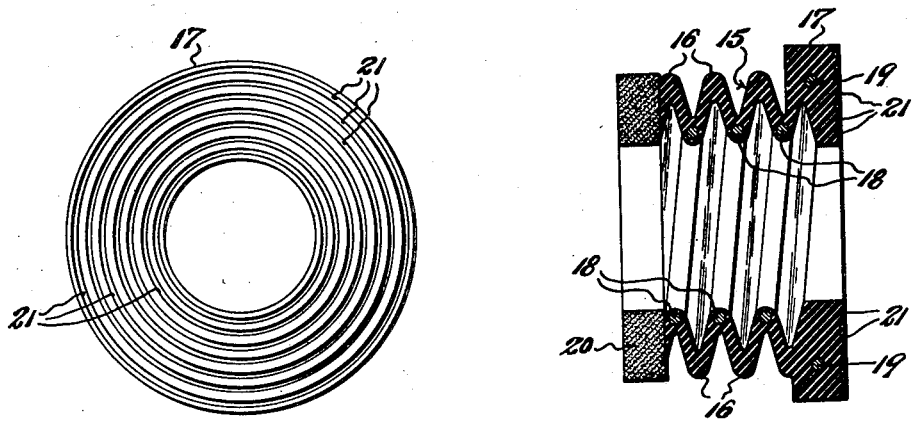
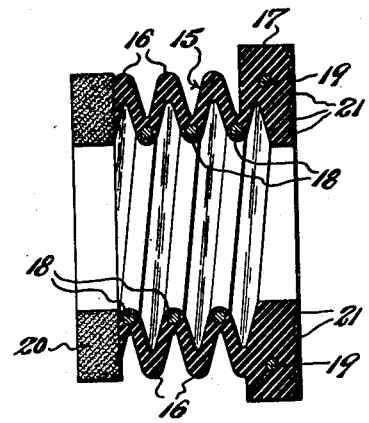
Fig.1  Fig.2  Fig.3  Fig.4
INVENTOR.
William H. McCloskey,
BY George L. Richards
Attorney Patented June 27, 1950

2,512,749

UNITED STATES PATENT OFFICE 2,512,749

FLUID SEALING DEVICE

William H. McCloskey, Huntington, W. Va., assignor to Henrite Products Corporation, Ironton, Ohio, a corporation of Ohio Application July 24, 1946, Serial No. 686,061

2 Claims. (Cl. 286—11)

This invention relates to improvements in fluid sealing devices; and the invention has reference, more particularly, to a sealing device for rotary shafts.

The invention has for an object to provide a novel form and construction of sealing device having a rigid low friction sealing nose at one end, and a resilient seal retainer ring at the opposite end, said sealing nose and retainer ring being joined by an elastic, spring reenforced, bellows-like couple or sleeve of helical form, and these parts being all bonded together into a unitary seal structure.

The invention has for another object to provide a fluid sealing device, characterized as above stated, in which the reenforcing spring is moulded into the elastic material of the bellows-like couple or sleeve conformably to the helical shape thereof, and so as to be completely covered by and bonded to the material of the latter, whereby to prevent relative motion or play between said couple or sleeve and the spring, and thus to avoid, in use, risk of scuffing, chafing or pinching of the couple or sleeve by the spring, with attendant risk of opening leaks in the seal structure, while, at the same time, the imbedded spring efficiently supports the couple or sleeve against collapse or undesirable distortion under pressure.

The invention has for another object to provide a fluid sealing device of the kind mentioned wherein an end portion of the couple or sleeve reenforcing spring is formed to provide one or more annular turns, which turns are imbedded in and bonded to the retainer ring, whereby to reenforce the same, so that it may be safely employed as a driving member for rotating the seal device.

The invention has for a further object to provide a fluid sealing device in which the sealing nose, retainer ring and helical bellows-like couple or sleeve, as bonded together, form a unitary structure, wherein the bellows-like couple or sleeve, due to its helical form, effects a compensating action with respect to torque variations.

Other objects of this invention, not at this time more particularly enumerated, will be understood from the following detailed description of the same.

Illustrative embodiments of this invention are shown in the accompanying drawings, in which:

Fig. 1 is a longitudinal sectional view of the fluid sealing device of this invention as applied to rotating mechanism and the shaft thereof so as to rotate therewith.

Fig. 2 is a side elevational view of the form of sealing device per se shown in Fig. 1; and Fig. 3 is an external face view of the retainer ring of the sealing device.

Fig. 4 is a longitudinal sectional view of a modified form of the fluid sealing device according to this invention.

Similar characters of reference are employed in the hereinabove described views, to indicate corresponding parts.

As illustratively shown in the accompanying drawings, the invention is embodied in a rotating type of seal, and is used to seal the shaft 10 of a rotor element, such as a pump impeller 11, driven by said shaft. The shaft 10 is journaled in a bearing 12 of the housing 13 within which said impeller 11 is contained. Said impeller is provided with a recess 14 concentric to the shaft, and the shaft is hermetically sealed by the surrounding sealing device of this invention which is adapted to be engaged in said recess 14.

The sealing device according to this invention comprise a bellows-like couple or sleeve 15, the angularly extending folds 16 of which form a continuous helix of suitable pitch extending from end to end of said couple or sleeve 15. The bellows-like helical couple or sleeve 15 is made of a suitable elastic plastic material, such e. g. as rubber or the like. Bonded to one end of said helical couple or sleeve 15, so as to be unitary therewith, is a retainer ring 17. Said retainer ring 17 is also made of a suitable elastic or resilient plastic material, such e. g. as rubber or the like, which may comprise the same compound as that of the helical couple or sleeve 15, or a compound different from that of the latter.

Molded into the material of the helical couple or sleeve 15, and extending into the retainer ring 17, is a metallic reinforcing spring 18, the helical pitch of which corresponds to that of said helical couple or sleeve. The helices of said spring 18 may be imbedded in the external apexes of the folds 16 of the helical couple or sleeve 15 (as shown in Figs. 1 and 2), or the same may be imbedded in the internal apexes of the folds 16 of said helical couple or sleeve (as shown in Fig. 4). In either case, the helices of said spring 18 are disposed conformably to the helical shape of the couple or sleeve 15, and so as to be completely covered by and bonded to the material of the latter, and consequently the relationship is such that no relative motion or play between these parts can occur, and all risk of scuffing, chafing, or pinching of the couple or sleeve by the spring is avoided. An end portion of the spring 18 terminates in one or more annular or closed turns 19 which are disposed to be molded into the material of the retainer ring 17, and thus imbedded therein to extend preferably through the mean center thereof. By this arrangement the retainer ring 17 is substantially reenforced and strengthened, whereby it may efficiently serve, when required, as a driving member for rotating the sealing device.

Bonded to the opposite end of the helical couple or sleeve 15 is a sealing nose 20 which is made of a suitable rigid low friction material which is non-abrasive, highly resistant to oxidation and corrosion, and preferably self-lubricating, such e. g. as graphite or a compound containing graphite.

From the above description it will be apparent that the assembly of sealing nose, retainer ring and spring reenforced helical couple or sleeve, as bonded together, forms a unitary or one piece sealing device which is in stable equilibrium at all times. Such unitary seal structure facilitates handling and manipulation of the device when installing the same in the place of use, and avoids all risk of undesirable stresses and distortion during the operations of installing the same.

In mounting the sealing device in operative relation to the shaft 10 and impeller 11, the device is slid over the shaft so as to surround the same, and is so disposed that the retainer ring 17 may be pressed or forced into the recess 14 of the impeller so as to tightly fit into and sealingly engage the recess walls, whereby to be affixed to the impeller so as to be driven thereby, and thus caused to rotate with the impeller and shaft. The axial opening of the retainer ring 17 is preferably so dimensioned as to hug the shaft 10, whereby to add to the sealing effect. The end face of the retainer ring 17, which bears against the bottom wall of the recess 14 of the impeller 11, is preferably provided with a series of concentric radially spaced annular grooves or channels 21, which form separate sealing spaces when the resilient body of the retainer ring is compressed against said bottom wall of the impeller recess 14. The sealing nose 20 of the installed device will sealingly thrust against an adjacent face surface 22 of the housing 13 under the tension of the axially compressed helical couple or sleeve 15 and its reenforcing spring 18, and will slide on said surface as the installed device rotates with the shaft 10 and impeller 11.

Not only is the spring reenforced helical couple or sleeve 15 yieldable to axial compression and axially expandible under resultant tension of such compression, but, owing to the helical form of its bellows-like folds 16 and associated turns of the reenforcing spring imbedded in the latter, said couple or sleeve 15 is efficiently adapted to compensate for any torque variations which may occur during rotation of the sealing device when driven by its fixed retainer ring portion, and consequently when frictional resistance to rotation is effective upon the rotating sealing nose 20, the helical couple or sleeve and its reenforcing spring will be caused to wind or unwind, according to the direction of torsional forces set up by the friction, with compensating effect. For example, when working and rotative thrust is applied to the sealing nose 20, under starting conditions, the frictional resistance to sliding movement of said sealing nose against the housing surface 22 will be high, but will tend to diminish as rotary movement accelerates. Under such circumstances, the elastic helical couple or sleeve and its spring will respond to the strong initial torque resistance and will wind so as to produce a counter torsional tension which will quickly overcome and compensate the frictional resistance to driving torque. As the frictional resistance to driving torque diminishes, the elastic helical couple or sleeve and its spring will unwind and resume normal condition. In this way torque variations, attendant especially upon starting and stopping phases of the sealed shaft movement, will be quickly and automatically compensated. Such compensating action will be smooth and free from shock by reason of the elasticity of the helical couple or sleeve material and the resiliency of its reenforcing spring. Such torque compensating effect is not obtained by the straight or annular corrugate forms of bellows-like couples or sleeves which are found in some heretofore known shaft sealing devices.

The reenforcing spring 18 as imbedded in and bonded to the helical bellows-like couple or sleeve 15 not only contributes substantially to the axial compressibility and reactionary expansion of the couple or sleeve, but also, by reason of the imbedded and bonded relation of the spring helices to the helices of the couple or sleeve, said couple or sleeve is very strongly and efficiently supported against any possibility of lateral collapse under either external or internal pressure.

In some cases, the reenforcing spring 18 may be omitted and the elastic helical bellows-like sleeve alone relied upon to provide for axial compressibility and reactionary expansion as well as torsional resiliency of the sealing device.

I am aware that some changes could be made in the sealing device structure above described and as shown in the accompanying drawings without departing from the scope of this invention as defined in the following claims. It is therefore intended that all matter contained in the foregoing description or shown in the accompanying drawings shall be interpreted as illustrative and not in a limiting sense.

I claim:

1. A fluid sealing device for the purposes set forth comprising a torsionally flexible sleeve of molded elastic rubberlike material having bellows-like folds extending helically from end to end thereof, a metallic compression spring having convolutions conforming to the convolutions of the helical folds of said sleeve, said spring convolutions being ' abedded within the material of the sleeve folds at apical portions thereof so as to be enveloped by said material and bonded to said folds, a sealing nose of rigid low friction material bonded to one end of said sleeve, and a retainer and driving ring of resilient material integral with the other end of said sleeve, all whereby said nose, spring included sleeve and retainer ring form a unitary structure.

2. A fluid sealing device for the purposes set forth comprising a torsionally flexible sleeve of molded elastic rubberlike material having bellows-like folds extending helically from end to end thereof, a metallic compression spring having convolutions conforming to the convolutions of the helical folds of said sleeve, said spring convolutions being imbedded within the material of the sleeve folds at apical portions thereof so as to be enveloped by said material and bonded to said folds, a sealing nose of rigid low friction material bonded to one end of said sleeve, and a retainer and driving ring of resilient material integral with the other end of said sleeve, one end of said spring extending into the body of said retainer ring and terminating in at least one annular turn which is enveloped by and bonded to the material of said retainer ring.

WILLIAM H. McCLOSKEY.

REFERENCES CITED

The following references are of record in the file of this patent:

UNITED STATES PATENTS

| Number | Name | Date |
|---|---|---|
| 1,363,378 | Vuilleumier | Dec. 28, 1920 |
| 1,586,725 | Westinghouse et al. | June 1, 1926 |
| 2,207,371 | Blackmore et al. | July 9, 1940 |
| 2,251,219 | Brummer | July 29, 1941 |
| 2,402,995 | Garraway | July 2, 1946 |

FOREIGN PATENTS

| Number | Country | Date |
|---|---|---|
| 522,720 | Great Britain | of 1940 |